United States Patent
King et al.

(10) Patent No.: US 9,620,974 B2
(45) Date of Patent: Apr. 11, 2017

(54) APPARATUS FOR TRANSFERRING ENERGY USING POWER ELECTRONICS AND MACHINE INDUCTANCE AND METHOD OF MANUFACTURING SAME

(71) Applicant: General Electric Company, Schenectady, NY (US)

(72) Inventors: Robert Dean King, Schenectady, NY (US); Robert Louis Steigerwald, Burnt Hills, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 458 days.

(21) Appl. No.: 14/169,338

(22) Filed: Jan. 31, 2014

(65) Prior Publication Data
US 2014/0145677 A1    May 29, 2014

Related U.S. Application Data

(63) Continuation of application No. 13/072,085, filed on Mar. 25, 2011, now Pat. No. 8,653,696, which is a
(Continued)

(51) Int. Cl.
*B60L 11/18* (2006.01)
*H02J 7/00* (2006.01)
(Continued)

(52) U.S. Cl.
CPC ........... *H02J 7/0052* (2013.01); *B60L 11/123* (2013.01); *B60L 11/14* (2013.01); *B60L 11/1811* (2013.01);
(Continued)

(58) Field of Classification Search
CPC .................................................. B60L 11/1814
(Continued)

(56) References Cited

U.S. PATENT DOCUMENTS

| 4,759,560 A | 7/1988 | Virgulti |
| 4,920,475 A | 4/1990 | Rippel |

(Continued)

FOREIGN PATENT DOCUMENTS

| EP | 0493848 A2 | 7/1992 |
| JP | 05-207664 A | 8/1993 |

(Continued)

OTHER PUBLICATIONS

Korean Office Action issued in connection with corresponding KR Application No. 1020090100614 on Nov. 1, 2015.
(Continued)

*Primary Examiner* — Fritz M Fleming
(74) *Attorney, Agent, or Firm* — Meagher Emanuel Laks Goldberg & Liao, LLP

(57) ABSTRACT

A fraction inverter circuit includes a first energy storage device configured to output a DC voltage, a first bi-directional DC-to-AC voltage inverter coupled to the first energy storage device, and a first electromechanical device. The first electromechanical device includes a first plurality of conductors coupled to the first bi-directional DC-to-AC voltage inverter, a second plurality of conductors coupled together, and a plurality of windings coupled between the first plurality of conductors and the second plurality of conductors. The traction converter circuit also includes a charge bus comprising a first conductor coupled to the second plurality of conductors of the first electromechanical device, the charge bus configured to transmit a charging current to or receive a charging current from the first electromechanical device to charge the first energy storage device via the first electromechanical device and the first bi-directional DC-to-AC voltage inverter.

20 Claims, 6 Drawing Sheets

Related U.S. Application Data continuation of application No. 12/256,457, filed on Oct. 22, 2008, now Pat. No. 7,932,633.

(51) Int. Cl.
 B60L 11/12 (2006.01)
 B60L 11/14 (2006.01)
 B60L 15/00 (2006.01)

(52) U.S. Cl.
 CPC ....... B60L 11/1814 (2013.01); B60L 11/1816 (2013.01); B60L 15/007 (2013.01); *B60L 2210/20* (2013.01); *B60L 2210/40* (2013.01); *B60L 2220/54* (2013.01); *Y02T 10/6217* (2013.01); *Y02T 10/641* (2013.01); *Y02T 10/645* (2013.01); *Y02T 10/7005* (2013.01); *Y02T 10/7072* (2013.01); *Y02T 10/7077* (2013.01); *Y02T 10/7094* (2013.01); *Y02T 10/725* (2013.01); *Y02T 10/7241* (2013.01); *Y02T 90/127* (2013.01); *Y02T 90/14* (2013.01); *Y10T 29/49108* (2015.01); *Y10T 29/49117* (2015.01); *Y10T 307/511* (2015.04); *Y10T 307/707* (2015.04)

(58) Field of Classification Search
 USPC .......................... 307/9.1, 10.1, 82; 320/109
 See application file for complete search history.

(56) References Cited

U.S. PATENT DOCUMENTS

| | | | |
|---|---|---|---|
| 5,373,195 | A | 12/1994 | De Doncker et al. |
| 5,504,414 | A | 4/1996 | Kinoshita |
| 5,589,743 | A | 12/1996 | King |
| 5,903,449 | A | 5/1999 | Garrigan et al. |
| 5,929,595 | A | 7/1999 | Lyons et al. |
| 6,331,365 | B1 | 12/2001 | King |
| 6,724,100 | B1 | 4/2004 | Gabriel |
| 6,737,822 | B2 | 5/2004 | King |
| 6,917,180 | B2 | 7/2005 | Harrison et al. |
| 7,049,792 | B2 | 5/2006 | King |
| 7,427,450 | B2 | 9/2008 | Raiser |
| 7,517,298 | B2 | 4/2009 | Ortmann |
| 7,559,388 | B2 | 7/2009 | Severinsky et al. |
| 7,595,597 | B2 | 9/2009 | King et al. |
| 7,932,633 | B2 | 4/2011 | King et al. |
| 7,952,236 | B2 | 5/2011 | Mitsutani |
| 8,183,820 | B2 | 5/2012 | Anwar et al. |
| 8,188,710 | B2 | 5/2012 | Ichikawa et al. |
| 2003/0067278 | A1 | 4/2003 | Nakamura et al. |
| 2006/0113798 | A1* | 6/2006 | Oyobe ................ B60L 11/1814 290/7 |
| 2007/0029881 | A1 | 2/2007 | Lai |
| 2007/0289794 | A1 | 12/2007 | Ishikawa et al. |
| 2009/0121659 | A1 | 5/2009 | Oyobe et al. |
| 2010/0019723 | A1 | 1/2010 | Ichikawa |
| 2011/0316481 | A1 | 12/2011 | Bouchez et al. |
| 2012/0007552 | A1 | 1/2012 | Song et al. |
| 2012/0013308 | A1 | 1/2012 | Briane et al. |

FOREIGN PATENT DOCUMENTS

| | | |
|---|---|---|
| JP | 05207664 A | 8/1993 |
| JP | 08-126122 A | 5/1996 |
| JP | 2002-354844 A | 12/2002 |
| JP | 2003116280 A | 4/2003 |
| JP | 2006-340466 A | 12/2006 |
| JP | 2008167616 A | 7/2008 |
| KR | 20050057895 A | 6/2005 |
| KR | 20070076544 A | 7/2007 |
| KR | 20080065990 A | 7/2008 |
| WO | 2006059748 A2 | 6/2006 |
| WO | 2007037240 A1 | 4/2007 |

OTHER PUBLICATIONS

Unofficial English translation of a JP Notice of Reason for Refusal dated Jan. 8, 2014 from corresponding Patent Application No. 2009-240959.
Lee et al., "An Integral Battery Charger for 4 Wheel Drive Electric Vehicle," IEEE 0-7803-1993-1/94, 1994, pp. 448-452.
Sul et al. "An Integral Battery Charger for Four-Wheel Drive Electric Vehicle," IEEE Transactions on Industry Applications, vol. 31, No. 5, Sep./Oct. 1995, pp. 1096-1099.
English Translation of Search Report for corresponding Japanese Application No. 2009-240959 dated Dec. 18, 2013.
English Translation of Notice of Allowance for corresponding Korean Application No. 2009-0100614 dated May 24, 2016.
English Translation of Office Action for corresponding Korean Application No. 2016-0107526 dated Nov. 22, 2016.
Solero, Luca, "Nonconventional On-Board Charger for Electric Vehicle Propulsion Batteries", IEEE Transactions on Vehicular Technology, vol. 50, No. 1, pp. 144-149, Jan. 2001.

* cited by examiner

APPARATUS FOR TRANSFERRING ENERGY USING POWER ELECTRONICS AND MACHINE INDUCTANCE AND METHOD OF MANUFACTURING SAME

CROSS-REFERENCE TO RELATED APPLICATION

The present application is a continuation of, and claims priority to, U.S. patent application Ser. No. 13/072,085, filed Mar. 25, 2011, which is a continuation of, and claims priority to, U.S. patent application Ser. No. 12/256,457, filed Oct. 22, 2008 and issued as U.S. Pat. No. 7,932,633, the disclosure of which is incorporated herein by reference.

BACKGROUND OF THE INVENTION

The invention relates generally to electric drive systems including hybrid and electric vehicles and to stationary drives that are subject to transient or pulsed loads and, more particularly, to transferring energy between an electrical storage device of the vehicle or drive and a power source external to the vehicle.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Plug-in electric vehicles, whether of the hybrid electric type or of the purely electric type, are configured to use electrical energy from an external source to recharge the traction battery. Such vehicles may include on-road and off-road vehicles, golf cars, neighborhood electric vehicles, forklifts, and utility trucks as examples. These vehicles may use either off-board stationary battery chargers or on-board battery chargers to transfer electrical energy from a utility grid or renewable energy source to the vehicle's on-board traction battery. Plug-in vehicles may include circuitry and connections to facilitate the recharging of the fraction battery from the utility grid or other external source, for example. The battery charging circuitry, however, may include dedicated components such as boost converters, high-frequency filters, choppers, inductors, and other electrical components dedicated only to transferring energy between the on-board electrical storage device and the external source. These additional dedicated components add extra cost and weight to the vehicle.

It would therefore be desirable to provide an apparatus to facilitate the transfer of electrical energy from an external source to the on-board electrical storage device of a plug-in vehicle that reduces the number of components dedicated only to transferring energy between the on-board electrical storage device and the external source.

BRIEF DESCRIPTION OF THE INVENTION

According to one aspect of the invention, a traction inverter circuit includes a first energy storage device configured to output a DC voltage, a first bi-directional DC-to-AC voltage inverter coupled to the first energy storage device, and a first electromechanical device. The first electromechanical device includes a first plurality of conductors coupled to the first bi-directional DC-to-AC voltage inverter, a second plurality of conductors coupled together, and a plurality of windings coupled between the first plurality of conductors and the second plurality of conductors. The traction converter circuit also includes a charge bus comprising a first conductor coupled to the second plurality of conductors of the first electromechanical device, the charge bus configured to transmit a charging current to or receive a charging current from the first electromechanical device to charge the first energy storage device via the first electromechanical device and the first bi-directional DC-to-AC voltage inverter.

In accordance with another aspect of the invention, a method includes coupling a first DC energy storage device to a first bi-directional DC-to-AC voltage inverter and coupling a first electromechanical device to the first bi-directional DC-to-AC voltage inverter, the first electromechanical device configured to convert mechanical energy into electrical energy and configured to convert electrical energy into mechanical energy. The method also includes coupling a conductor to the first electromechanical device, wherein the conductor is configured to transfer a charging current through the first electromechanical device to charge the first energy storage device via the first electromechanical device and via the first bi-directional DC-to-AC voltage inverter.

In accordance with yet another aspect of the invention, a system includes a machine configured to convert mechanical energy into electrical energy and configured to convert electrical energy into mechanical energy. The machine includes a plurality of windings, each winding having a first end and a second end, a plurality of first conductors, each first conductor coupled to a respective winding at the first end thereof, and a plurality of second conductors, each second conductor coupled to a respective winding at the second end thereof. The system also includes a voltage inverter configured to convert AC electrical energy into DC electrical energy and to convert DC electrical energy into AC electrical energy, the voltage inverter coupled to the plurality of windings via the plurality of first conductors. A first energy storage device is coupled to the voltage inverter, and a charging conductor is coupled to the plurality of windings via the plurality of second conductors, the charging conductor configured to transmit charging energy through the machine to charge the first energy storage device.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
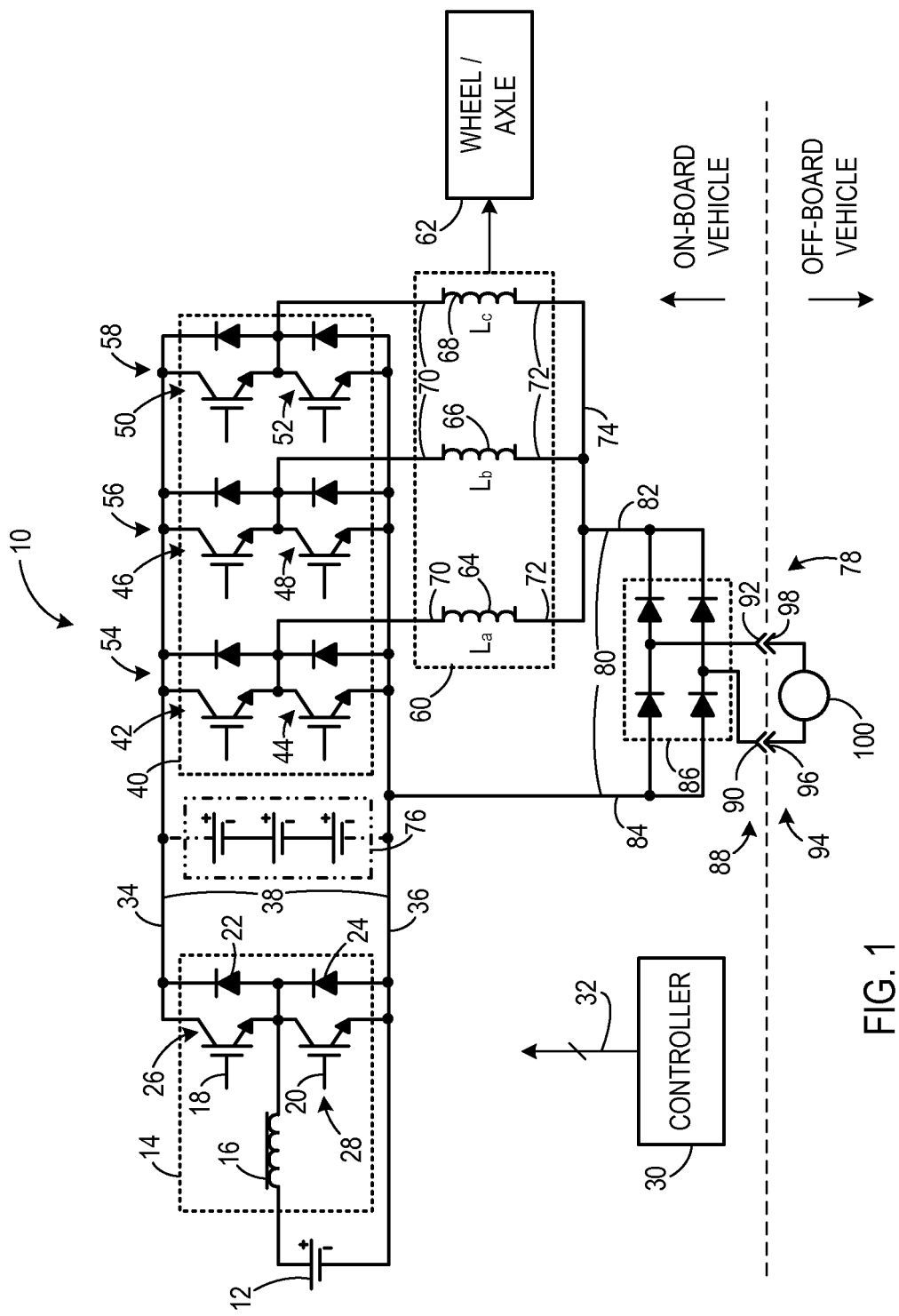
FIG. 1 is a schematic diagram of a fraction system according to an embodiment of the invention.

FIG. 1 is a schematic diagram of a traction system 10 according to an embodiment of the invention. Traction system 10 includes a first energy storage device 12. In one embodiment, first energy storage device 12 is a low-voltage energy storage device and may be a battery, a fuel cell, an ultracapacitor, or the like. First energy storage device 12 is coupled to a bi-directional DC-to-DC voltage converter 14 configured to convert one DC voltage into another DC voltage. Bi-directional DC-to-DC voltage converter 14 includes an inductor 16 coupled to a pair of switches 18, 20 and coupled to a pair of diodes 22, 24. Each switch 18, 20 is coupled to a respective diode 22, 24, and each switch/diode pair forms a respective half phase module 26, 28. Switches 18, 20 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs).

Traction system 10 includes a controller 30 coupled to switches 18, 20 via a respective pair of lines 32. Controller 30, through appropriate control of switches 18 and 20, is configured to control bi-directional DC-to-DC voltage converter 14 to boost a voltage of first energy storage device 12 to a higher voltage and to supply the higher voltage to a pair of conductors 34, 36 of a DC bus 38 coupled to bi-directional DC-to-DC voltage converter 14. Controller 30 is also configured to control switches 18 and 20 of bi-directional DC-to-DC voltage converter 14 to buck a voltage from the DC bus 38 and supply the bucked voltage to first energy storage device 12.

Traction system 10 includes a bi-directional DC-to-AC voltage inverter 40 coupled to DC bus 38. Bi-directional DC-to-AC voltage inverter 40 includes six half phase modules 42, 44, 46, 48, 50, and 52 that are paired to form three phases 54, 56, and 58. Each phase 54, 56, 58 is coupled to conductors 34 and 36 of DC bus 38. An electromechanical device or machine 60 is coupled to bi-directional DC-to-AC voltage inverter 40. In one embodiment, electromechanical device 60 is a traction motor mechanically coupled to one or more driving wheels or axles 62 of a vehicle (not shown). Electromechanical device 60 includes a plurality of windings 64, 66, and 68 having a plurality of conductors 70 coupled to respective phases 54, 56, 58 of bi-directional DC-to-AC voltage inverter 40. Windings 64-68 also have a plurality of conductors 72 coupled together to form a node 74.

Controller 30 is coupled to half phase modules 42-52 via respective lines 32. Controller 30, through appropriate control of half phase modules 42-52, is configured to control bi-directional DC-to-AC voltage inverter 40 to convert a DC voltage or current on DC bus 38 to an AC voltage or current for supply to windings 64-68 via conductors 70. Accordingly, the DC voltage or current from first energy storage device 12 may be boosted via bi-directional DC-to-DC voltage converter 14 to a higher DC voltage or current that is then converted into an AC voltage or current and delivered to motor 60 to drive wheels 62. In other non-vehicle propulsion systems, the drive wheels 62 may be a pulsed load (not shown), including a pump, fan, winch, crane, or other motor driven loads. In a regenerative braking mode, electromechanical device 60 may be operated as a generator to brake wheels 62 and to supply AC voltage or current to bi-directional DC-to-AC voltage inverter 40 for inversion into a DC voltage or current onto DC bus 38. Thereafter, the DC voltage or current may be bucked or converted into another DC voltage or current via bi-directional DC-to-DC voltage converter 14 that is suitable for recharging first energy storage device 12.

In an embodiment of the invention, a second energy storage device 76 (shown in phantom) may be coupled to DC bus 38 to provide additional power to drive wheels 62. Second energy storage device 76 may be configured to provide a higher power than first energy storage device 12 to provide power during, for example, acceleration periods of the vehicle. First energy storage device 12 may be configured to provide a higher energy than second energy storage device 76 to provide a longer-lasting power to the vehicle to increase a travelling distance thereof. Energy supplied via second energy storage device 76 to DC bus 38 may also be inverted via bi-directional DC-to-AC voltage inverter 40 and supplied to motor electromechanical device 60. Similarly, energy generated during a regenerative braking mode may also be used to recharge second energy storage device 76 via bi-directional DC-to-AC voltage inverter 40.

When a vehicle incorporating traction system 10 is parked or not in use, it may be desirable to plug the vehicle into, for example, the utility grid or to a renewable energy source to refresh or recharge either or both of the energy storage devices 12, 76. Accordingly, FIG. 1 shows an embodiment of the invention including a charging system 78 coupled to traction system 10 for the recharging of energy storage devices 12, 76 such that components of traction system 10 may be used for the dual purposes of recharging energy storage devices 12, 76 and converting energy from energy storage devices 12, 76 into energy usable to propel the vehicle.

Charging system 78 includes a charging bus 80 having a pair of conductors 82, 84. As shown in FIG. 1, conductor 82 is coupled to node 74, and conductor 84 is coupled to conductor 36 of DC bus 38. Charging system 78 includes a rectifier 86 coupled to charging bus 80 and coupled to a receptacle 88 having contacts 90, 92 configured to mate with a plug 94 having contacts 96, 98 of an external power source 100. In one embodiment, it is contemplated that external power source 100 is an AC source and that one, two, or three phases of external power source 100 may be used and that external power source 100 may provide, for example, 120 Vac or 240 Vac power. In a configuration designed for operation from a three phase AC external power source 100, rectifier 86 may be modified to include two additional diodes (not shown) for the third phase of a three phase rectifier. According to another embodiment of the invention, it is contemplated that external power source 100 is a DC source. Coupling DC source 100 to charging bus 80 through rectifier 86 helps to ensure that the charging voltage transferred to charging bus 80 has the correct polarity if DC source 100 is coupled to rectifier 86 with a reverse polarity.

The power factor of an AC electric power system is defined as the ratio of the real power to the apparent power and may be expressed as a number between 0 and 1 or as a percentage between 0 and 100. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. A circuit with a lower power factor performs less work than a circuit with a higher power factor. Therefore, to perform the same amount of work, a higher voltage or current is input into the circuit with the lower power factor.

In circuits having sinusoidal currents and voltages, the power factor may be decreased due to differences in phase between the current and voltage. Switch-mode power supplies may be configured to control the amount of power drawn by a load to increase the energy transfer power factor. In some applications, a switch-mode power supply, such as one including a buck/boost converter for example, controls the current output therefrom so that the current waveform is proportional to the voltage waveform output therefrom. For example, the buck/boost converter may shape the current waveform into a sine wave that is in phase with a sine wave of the voltage waveform. The boost converter can be controlled to maintain a constant DC bus output line voltage while drawing a current that is in phase with, and at the same frequency as, the output line voltage.

When external power source 100 is connected to charging system 78 through contacts 90, 92, 96, 98, controller 30 is configured to control, for example, half phase modules 42, 44 of phase 54 to boost or buck charging voltage applied to winding 64 of electromechanical device 60. Bucking the charging voltage when it is higher than the respective storage device being charged allows the traction system 10 to operate at a high or near-unity power factor based on a wide range of line voltages input from external power source 100 that are consistent with voltage ratings of the elements of traction system 10. The boosted or bucked charging voltage is supplied to DC bus 38 and is used to directly recharge second energy storage device 76 if present, and to recharge first energy storage device 12 via bucking control of bi-directional DC-to-DC voltage converter 14 by controller 30. Controller 30 may also be configured to additionally control half phase modules 46, 48 of phase 56 and/or half phase modules 50, 52 of phase 58 to operate bi-directional DC-to-AC voltage inverter 40 as a two- or three-phase boost circuit in an interleaving mode during charging to reduce ripple. Further, the one-, two-, or three-phase operation during charging may maximize part-load charging efficiency.

Figure 2:
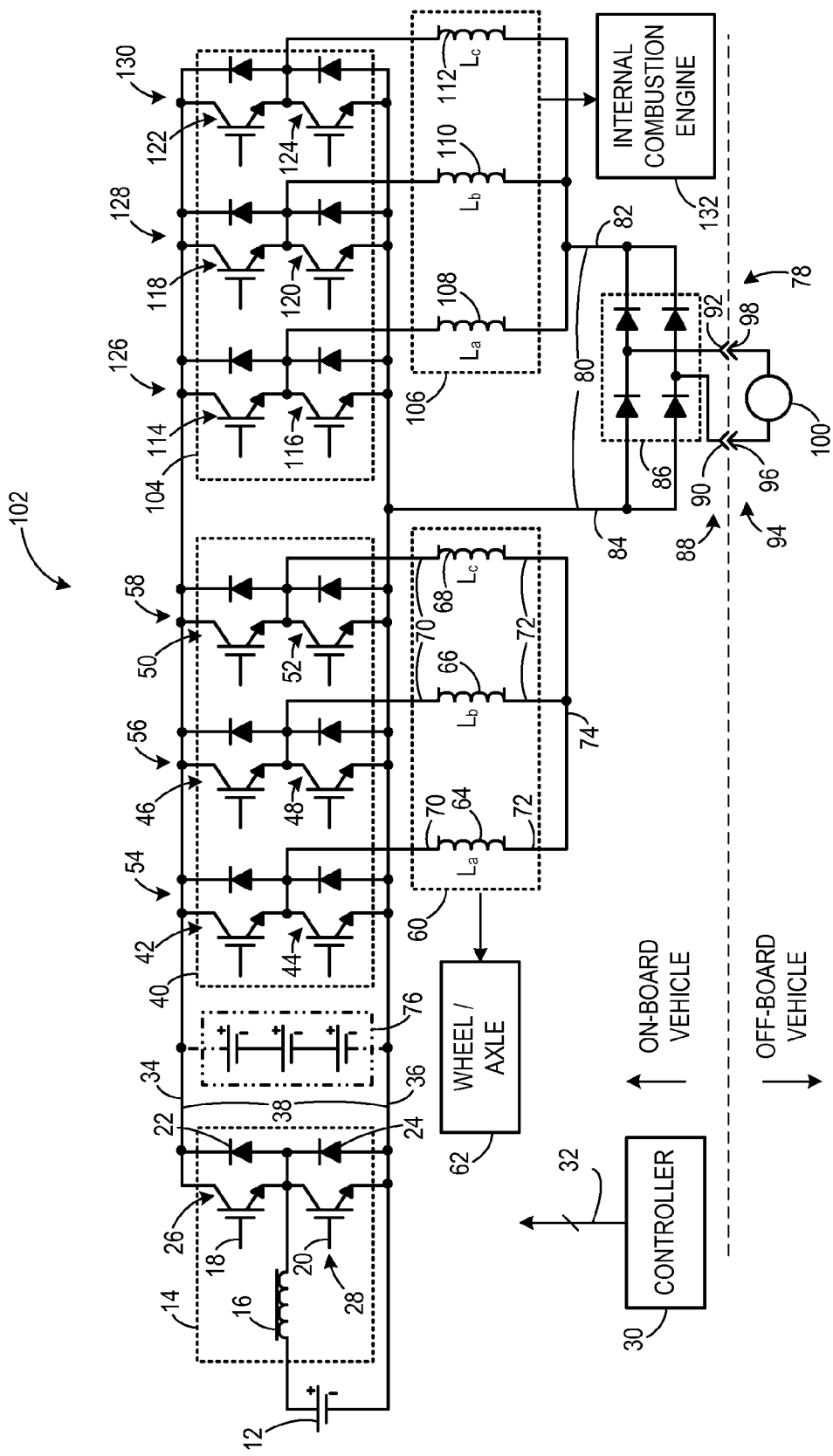
FIG. 2 is a schematic diagram of another traction system according to an embodiment of the invention.

FIG. 2 shows a schematic diagram of a traction system 102 according to another embodiment of the invention. Elements and components common to traction systems 10 and 102 will be discussed relative to the same reference numbers as appropriate. FIGS. 3-6 will also discuss common components relative to the same reference numbers. Traction system 102 includes a second bi-directional DC-to-AC voltage inverter 104 coupled to a second electromechanical device 106, which includes a plurality of windings 108, 110, and 112. Second bi-directional DC-to-AC voltage inverter 104 includes six half phase modules 114, 116, 118, 120, 122 and 124 that are paired to form three phases 126, 128, and 130. Each phase 126, 128, 130 is coupled to conductors 34 and 36 of DC bus 38.

In an embodiment of the invention, electromechanical device 60 is a traction motor coupled to wheels 62, and electromechanical device 106 is an alternator mechanically coupled to an internal combustion engine 132. Controller 30 is coupled to half phase modules 114-124 via respective lines 32. Controller 30, through appropriate control of half phase modules 114-124, is configured to control cranking inverter 104 to convert a DC voltage or current on DC bus 38 to an AC voltage or current for supply to windings 108-112 of alternator 106 to produce torque to crank internal combustion engine 132. Alternatively, internal combustion engine 132 may apply torque to alternator 106 to supply AC voltage or current to cranking inverter 104 for inversion into a DC voltage or current onto DC bus 38. Thereafter, the DC voltage or current recharges second energy storage device 76 and/or may be bucked or converted into another DC voltage or current via bi-directional DC-to-DC voltage converter 14 that is suitable for recharging first energy storage device 12.

As shown in FIG. 2, charging system 78 is coupled to alternator 106. It is contemplated, however, that charging system 78 may alternatively coupled to motor 60 as shown in FIG. 1. Accordingly, controller 30 is configured to control, for example, half phase modules 114, 116 of phase 126 to boost charging voltage or current flowing into winding 108 of alternator 106. The boosted charging voltage is supplied to DC bus 38 and is used to directly recharge second energy storage device 76, if present, and to recharge first energy storage device 12 via bucking control of bi-directional DC-to-DC voltage converter 14 by controller 30. If second energy storage device 76 is not present, a DC Link filter capacitor (not shown) contained within the inverter 104 provides the smoothing function for the DC bus 38, and recharge of the first energy storage device 12 can be charged via bucking control of bi-directional DC-to-DC voltage converter 14 by controller 30. Accordingly, a high power factor may be realized for configurations where a DC voltage level on DC bus 38 is higher than the peak voltage of rectifier 86 output. Controller 30 may also be configured to additionally control half phase modules 118, 120 of phase 128 and/or half phase modules 122, 124 of phase 130 to operate cranking inverter 104 as a two- or three-phase boost circuit in an interleaving mode during charging to reduce ripple. Further, the one-, two-, or three-phase operation during charging may maximize part-load charging efficiency.

Figure 3:
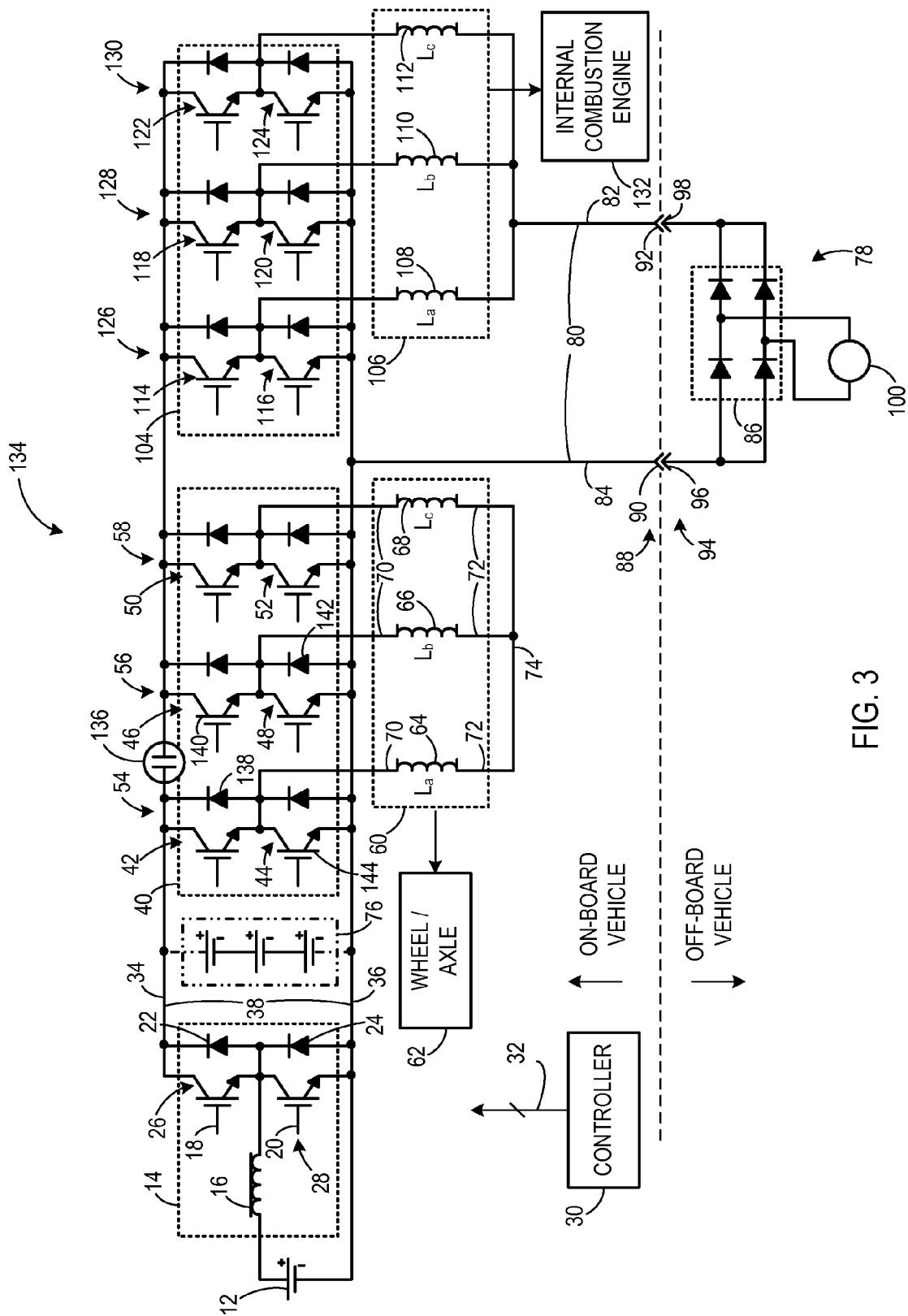
FIG. 3 is a schematic diagram of another traction system according to an embodiment of the invention.

FIG. 3 shows a schematic diagram of a traction system 134 according to another embodiment of the invention. Traction system 134 is based on the traction system 102 of FIG. 2. Traction system 134, however, shows an embodiment of the invention where rectifier 86 is external to traction system 134. External rectifier 86 is connected to charging bus 80 through contacts 90, 92, 96, 98 of receptacle 88 and plug 94. In this manner, rectifier 86 may be integrated with a module connected to external AC power source 100 off-board the vehicle (not shown).

Traction system 134 also includes a contactor 136 coupled to conductor 34 of DC bus 38 between, for example, phases 54, 56 of bi-directional DC-to-AC voltage inverter 40. In this embodiment, controller 30 is configured to control half phase modules 42-48 such that bi-directional DC-to-AC voltage inverter 40 is a buck/boost converter. That is, controller 30 may control bi-directional DC-to-AC voltage inverter 40 to buck or boost charging voltage or current depending on the value of the charging voltage or current.

For example, if the charging voltage is less than that needed to recharge second energy storage device 76, if present, such as when the charging voltage is less than the voltage on DC bus 38, controller 30 controls bi-directional DC-to-AC voltage inverter 40 to boost the charging voltage. If the charging voltage is more than that needed to recharge second energy storage device 76, if present, such as when the charging voltage is more than the voltage on DC bus 38, controller 30 controls bi-directional DC-to-AC voltage inverter 40 to buck the charging voltage. If the charging voltage is less than that needed to recharge second energy storage device 76, controller 30 controls bi-directional DC-to-AC voltage inverter 40 to boost the charging voltage. In a bucking mode, a diode 138 of half phase module 42 conducts while controller 30 controls a switch 140 of half phase module 46 to cause current to alternately flow through switch 140 and a diode 142 of half phase module 48. In a boosting mode, controller 30 controls switch 140 of half phase module 46 to remain on while alternately causing current to flow through a switch 144 of half phase module 44 and diode 138 of half phase module 42. In this manner, windings 64-66 act as inductors. Because bi-directional DC-to-AC voltage inverter 40 is operable via controller 30 as both a boost converter and also a buck converter, charge voltage can be any value up to the voltage ratings of the semiconductors and associated passive components, while near unity power factor can be maintained throughout the charge voltage waveform. In the event that storage device 76 is not present, an input DC link filter capacitor or smoothing capacitor (not shown) contained in the DC-AC inverter 40 maintains the voltage of DC bus 38 that is supplied to bi-directional DC-to-DC voltage converter 14 as described in FIG. 1 to charge the first energy storage device 12.

Figure 4:
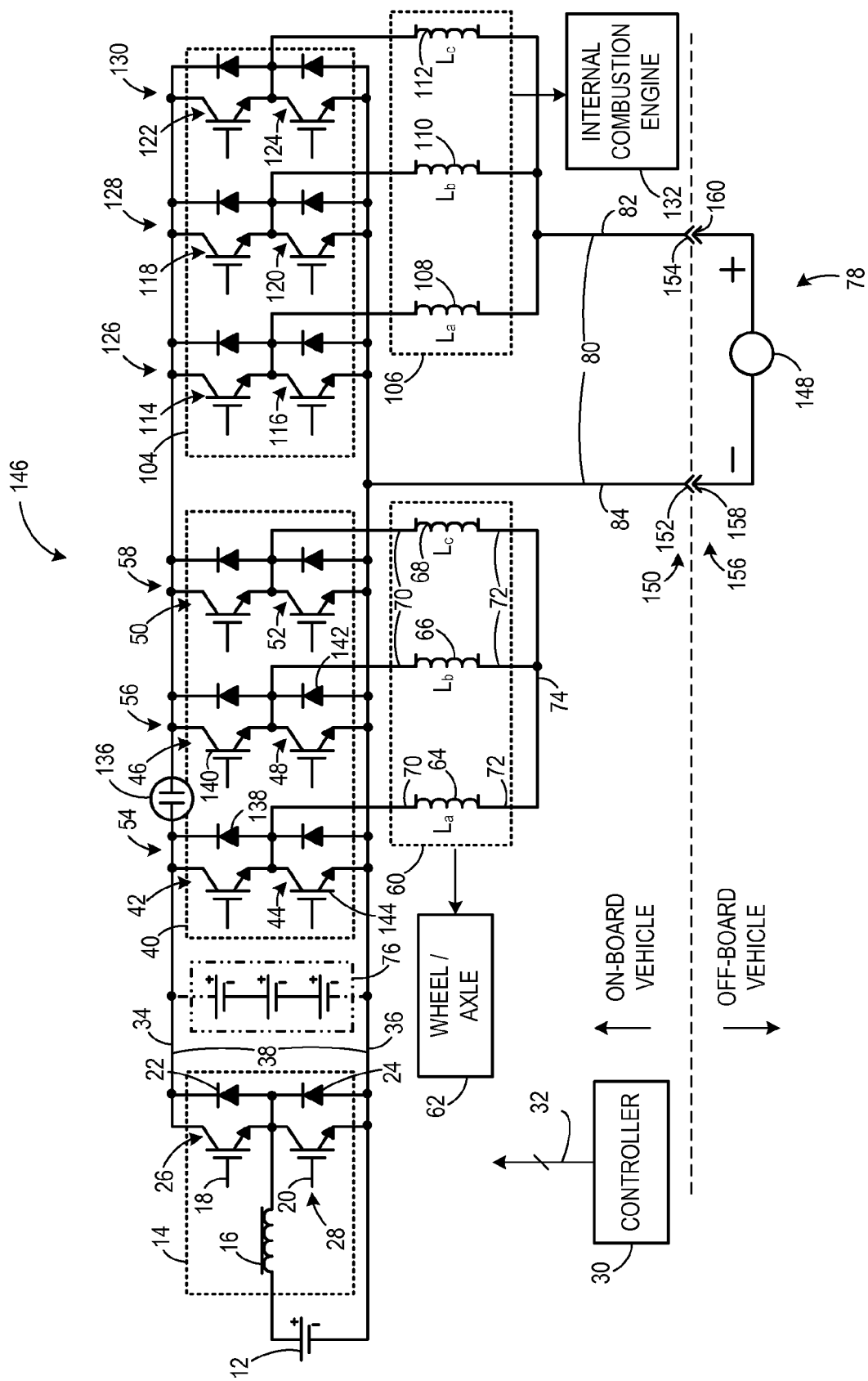
FIG. 4 is a schematic diagram of another traction system according to an embodiment of the invention.

FIG. 4 shows a schematic diagram of a traction system 146 according to another embodiment of the invention. Traction system 146 is based on traction system 134 of FIG. 3. Traction system 146, however, includes a DC source or sink 148 directly connected to charging bus 80 via a receptacle 150 having contacts 152, 154 configured to mate with a plug 156 having contacts 158, 160 instead of including a rectifier coupled to a utility grid. Controller 30 operates or controls bi-directional DC-to-AC voltage inverter 40 to buck or boost charging voltages or currents passing therethrough as described above. DC voltage source 148 can be a charging voltage source with maximum voltage up to the voltage rating of the semiconductors and associated passive components.

In an alternate embodiment of the invention, DC source 148 may be a DC load, including, for example, a resistor or DC motor to allow energy storage device 12 and/or energy storage device 76, if present, via operation of boost converter 14 and controller 30, to be discharged for functional testing or calibration or for operation of the DC load.

Figure 5:
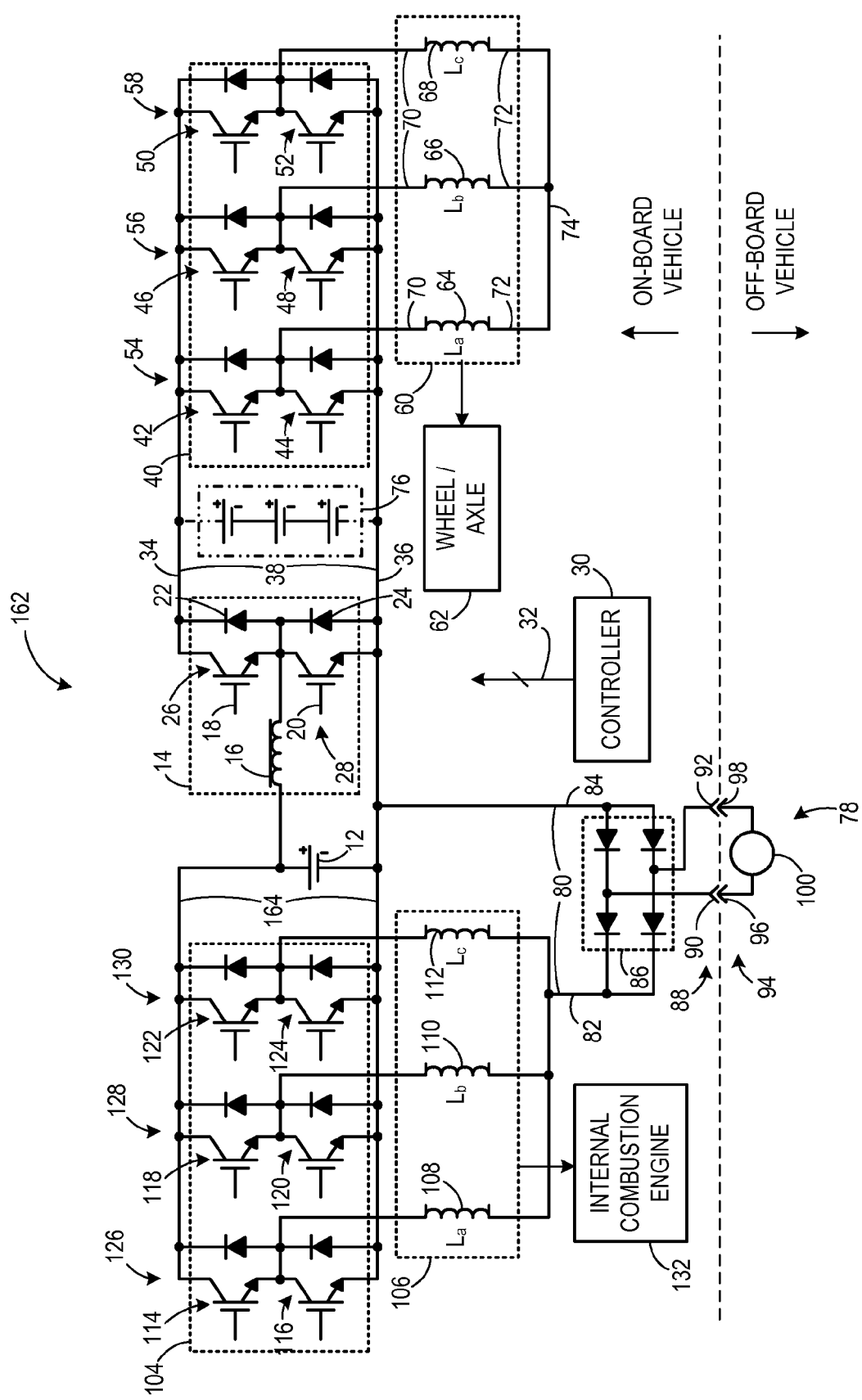
FIG. 5 is a schematic diagram of another traction system according to an embodiment of the invention.

FIG. 5 shows a schematic diagram of a traction system 162 according to another embodiment of the invention. Traction system 162 includes first and second bi-directional DC-to-AC voltage inverters 40, 104 and electromechanical devices 60, 106 similar to fraction system 102 of FIG. 2. However, bi-directional DC-to-AC voltage inverter 104 shown in FIG. 5 is coupled in parallel to first energy storage device 12 across a second DC bus 164 rather than in parallel to bi-directional DC-to-AC voltage inverter 40 across DC bus 38 as shown in FIG. 2. Accordingly, a charging voltage from external power source 100 is boosted through bi-directional DC-to-AC voltage inverter 104 via appropriate control via controller 30. The boosted charging voltage or current directly recharges first energy storage device 12 and recharges second energy storage device 76, if present, via boosting control of bi-directional DC-to-DC voltage converter 14. Controller 30 may also be configured to additionally control half phase modules 118, 120 of phase 128 and/or half phase modules 122, 124 of phase 130 to operate cranking inverter 104 as a two- or three-phase boost circuit in an interleaving mode during charging to reduce ripple. Further, the one-, two-, or three-phase operation during charging may maximize part-load charging efficiency. Controller 30 may also be configured to additionally control half phase modules 114, 116 of phase 126, half phase modules 118, 120 of phase 128, and half phase modules 122, 124 of phase 130 to operate cranking inverter 104 as a AC-DC converter to provide a controlled charge voltage to energy storage device 12 and power to operate traction drive system comprised of DC to AC inverter 40 and electrical machine 60 using power from internal combustion engine 132 driving alternator 106.

Figure 6:
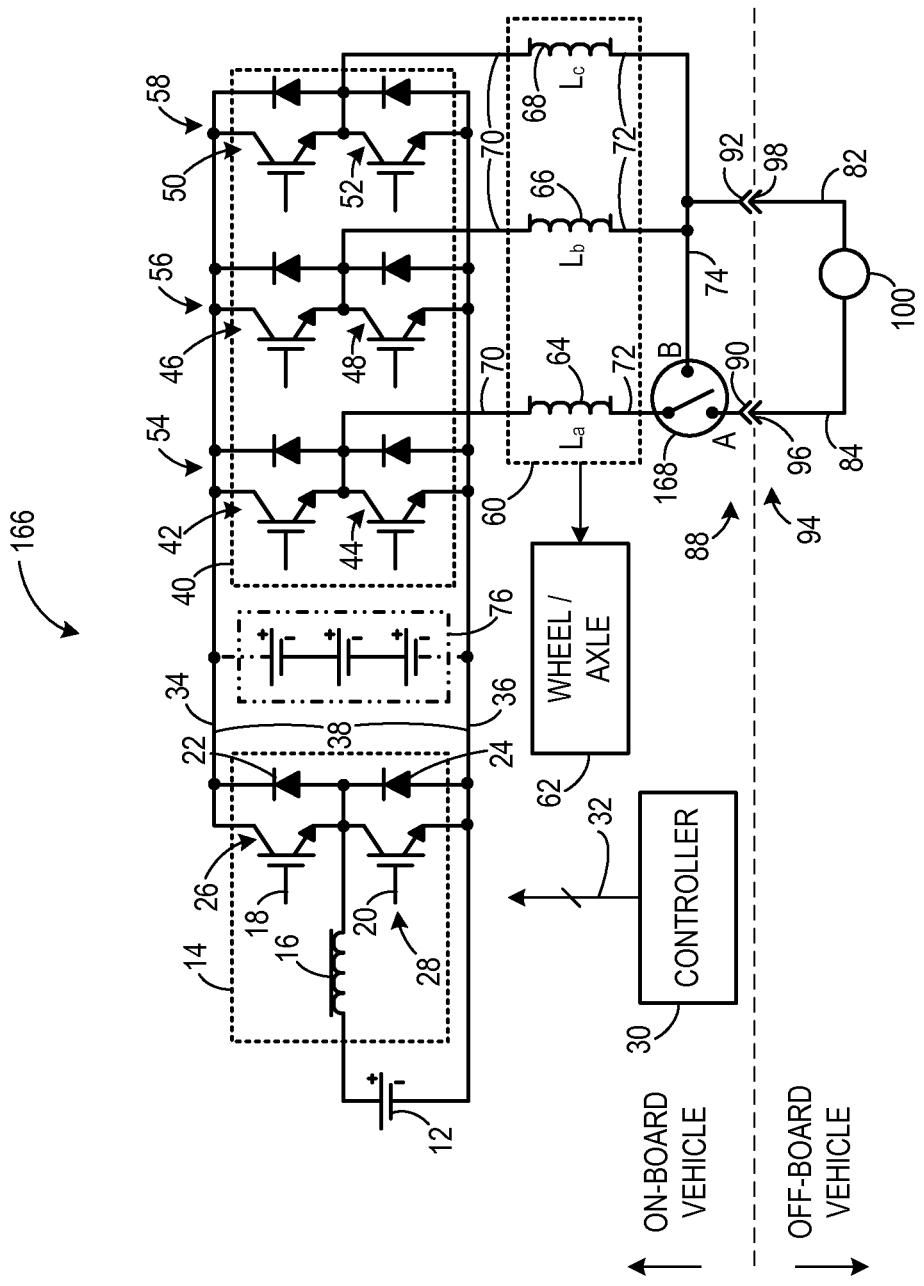
FIG. 6 is a schematic diagram of another traction system according to an embodiment of the invention.

FIG. 6 shows a traction system 166 according to another embodiment of the invention. Traction system 166 includes a switch 168 coupled to winding 64, to node 74, and to conductor 84 of charging bus 80. Controller 30 is coupled to switch 168 one or more respective lines 32. In a charging mode, controller 30 controls switch 168 to couple winding 64 to conductor 84. In this manner, charging voltage from external power source 100, such as an AC utility grid, is boosted through bi-directional DC-to-AC voltage inverter 40 and is used to directly recharge second energy storage device 76, if present, and to recharge first energy storage device 12 via bucking control of bi-directional DC-to-DC voltage converter 14. In a motoring mode, external power source 100 is disconnected from fraction system 166, and controller 30 controls switch 168 to couple winding 64 to node 74. In this manner, energy from first and/or second energy storage devices 12, 76 may be inverted and supplied to electromechanical device 60 for driving wheels 62.

Controller 30, in addition to controlling half phase modules 42-52 to boost charging voltage or current, appropriately controls half phase modules 42-52 to rectify an AC charging voltage or current. Accordingly, a rectifier, such as rectifier 86 shown in FIG. 1, is not needed.

Embodiments of the invention thus use inverters and machine inductances of a traction control system to recharge one or more energy storage devices of the traction control system. In this manner, the inverters and machines may be used for the dual purposes of motoring and recharging the energy storage devices. Using the inverters and machine inductances allows for high-power factor, low harmonic charging of the energy storage devices.

According to one embodiment of the invention, a traction inverter circuit includes a first energy storage device configured to output a DC voltage, a first bi-directional DC-to-AC voltage inverter coupled to the first energy storage device, and a first electromechanical device. The first electromechanical device includes a first plurality of conductors coupled to the first bi-directional DC-to-AC voltage inverter, a second plurality of conductors coupled together, and a plurality of windings coupled between the first plurality of conductors and the second plurality of conductors. The traction converter circuit also includes a charge bus comprising a first conductor coupled to the second plurality of conductors of the first electromechanical device, the charge bus configured to transmit a charging current to or receive a charging current from the first electromechanical device to charge the first energy storage device via the first electromechanical device and the first bi-directional DC-to-AC voltage inverter.

In accordance with another embodiment of the invention, a method includes coupling a first DC energy storage device to a first bi-directional DC-to-AC voltage inverter and coupling a first electromechanical device to the first bi-directional DC-to-AC voltage inverter, the first electromechanical device configured to convert mechanical energy into electrical energy and configured to convert electrical energy into mechanical energy. The method also includes coupling a conductor to the first electromechanical device, wherein the conductor is configured to transfer a charging current through the first electromechanical device to charge the first energy storage device via the first electromechanical device and via the first bi-directional DC-to-AC voltage inverter.

In accordance with yet another embodiment of the invention, a system includes a machine configured to convert mechanical energy into electrical energy and configured to convert electrical energy into mechanical energy. The machine includes a plurality of windings, each winding having a first end and a second end, a plurality of first conductors, each first conductor coupled to a respective winding at the first end thereof, and a plurality of second conductors, each second conductor coupled to a respective winding at the second end thereof. The system also includes a voltage inverter configured to convert AC electrical energy into DC electrical energy and to convert DC electrical energy into AC electrical energy, the voltage inverter coupled to the plurality of windings via the plurality of first conductors. A first energy storage device is coupled to the voltage inverter, and a charging conductor is coupled to the plurality of windings via the plurality of second conductors, the charging conductor configured to transmit charging energy through the machine to charge the first energy storage device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
a first bi-directional DC-to-AC inverter coupled to a first DC bus;
a first electromechanical device coupled to the first bi-directional DC-to-AC inverter;
a bi-directional DC-to-DC converter coupled between the first DC bus and a second DC bus;
a first energy storage device coupled to the second DC bus;
a second bi-directional DC-to-AC inverter coupled to the first energy storage device; and
a charge bus coupled to the second bi-directional DC-to-AC inverter through at least one winding of a second electromechanical device, the charge bus configured to receive a charging voltage from an external power source and supply the charging voltage to the second bi-directional DC-to-AC inverter.

2. The apparatus of claim 1 further comprising a controller configured to:
selectively control switching of the second bi-directional DC-to-AC inverter to:
convert a DC voltage on the second DC bus into an AC voltage suitable for supplying to the second electromechanical device; and
convert a charging voltage supplied to the first electromechanical device from the external power source into a DC voltage suitable for charging the first energy storage device; and
selectively control switching of the first bi-directional DC-to-AC inverter to:
convert a DC voltage on the first DC bus into an AC voltage suitable for supplying to the first electromechanical device; and
convert an AC voltage of the first electromechanical device to a DC voltage suitable for delivery to the first DC bus.

3. The apparatus of claim 2 wherein the controller is further configured to selectively control switching of the bi-directional DC-to-DC converter to convert the DC voltage on the first DC bus to the DC voltage suitable for charging the first energy storage device.

4. The apparatus of claim 1 further comprising a second energy storage device coupled to the first DC bus.

5. The apparatus of claim 4 wherein the second energy storage device comprises an ultracapacitor; and
wherein the first energy storage device comprises a battery having a lower voltage than the ultracapacitor.

6. The apparatus of claim 1 wherein the charge bus comprises:
a first conductor coupled to the second bi-directional DC-to-AC inverter and the external power source; and
a second conductor coupled to the second electromechanical device and the external power source.

7. The apparatus of claim 1 wherein the first electromechanical device comprises a traction motor; and
wherein the second electromechanical device comprises an alternator.

8. A method of manufacturing comprising:
providing a first energy storage device;
coupling a low-voltage side of a bi-directional DC-to-DC converter to the first energy storage device;
coupling a high-voltage side of the bi-directional DC-to-DC converter to a first DC bus;
coupling a first bi-directional DC-to-AC inverter to the first DC bus;
coupling a first electromechanical device to the first bi-directional DC-to-AC inverter;
coupling a second bi-directional DC-to-AC inverter in parallel with the first energy storage device across a second DC bus;
coupling a second electromechanical device to the second bi-directional DC-to-AC inverter; and
coupling a charge bus to the second bi-directional DC-to-AC inverter and an external power source.

9. The method of claim 8 further comprising coupling the charge bus to the second bi-directional DC-to-AC inverter through at least one winding of the second electromechanical device.

10. The method of claim 8 further comprising electrically coupling a controller to the first and second bi-directional DC-to-AC inverters and to the bi-directional DC-to-DC converter to selectively control switching thereof.

11. The method of claim 10 further comprising coupling a second energy storage device to the first DC bus, the second energy storage device having a higher voltage than the first energy storage device.

12. A charging system comprising:
an external power source; and
a vehicle comprising:
  a first DC bus;
  a first bi-directional DC-to-AC voltage inverter configured to invert an AC voltage of a first electromechanical device to a first DC voltage and supply the first DC voltage to the first DC bus;
  a bi-directional DC-to-DC voltage converter coupled to the first DC bus and configured to convert the first DC voltage to a second DC voltage and supply the second DC voltage to a second DC bus;
  a second bi-directional DC-to-AC voltage inverter coupled in parallel to a first energy storage device across the second DC bus, the second bi-directional DC-to-AC voltage inverter configured to invert an AC voltage of a second electromechanical device to a DC voltage suitable for charging the first energy storage device;
  a charge bus configured to receive a charging voltage from the external power source and supply the charging voltage to the second electromechanical device; and
  a controller configured to selectively control switching of the first bi-directional DC-to-AC voltage inverter, the second bi-directional DC-to-AC voltage inverter, and the bi-directional DC-to-DC voltage converter.

13. The charging system of claim 12 further comprising an internal combustion engine coupled to the second electromechanical device.

14. The charging system of claim 12 wherein the external power source comprises an AC power source.

15. The charging system of claim 12 wherein the external power source comprises a DC power source.

16. The charging system of claim 12 further comprising a second energy storage device configured to supply electrical energy to the first DC bus, the second energy storage device having a higher voltage than the first energy storage device.

17. The charging system of claim 16 wherein the controller is further configured to selectively control switching of the bi-directional DC-to-DC voltage converter to:
  convert a DC voltage on the first DC bus into a DC voltage suitable for charging the second energy storage device; and
  convert a DC voltage on the second DC bus into a DC voltage suitable for charging the first energy storage device.

18. The charging system of claim 12 wherein the second bi-directional DC-to-AC voltage inverter comprises a three-phase DC-to-AC voltage inverter having a plurality of half-phase modules; and
  wherein the controller is further configured to control switching of the plurality of half-phase modules to cause the second bi-directional DC-to-AC voltage inverter to operate as a two-phase circuit.

19. The charging system of claim 12 further comprising a rectifier coupled between the charging bus and the external power source.

20. The charging system of claim 19 wherein the rectifier is located off-board the vehicle.

* * * * *